Patented Feb. 7, 1950

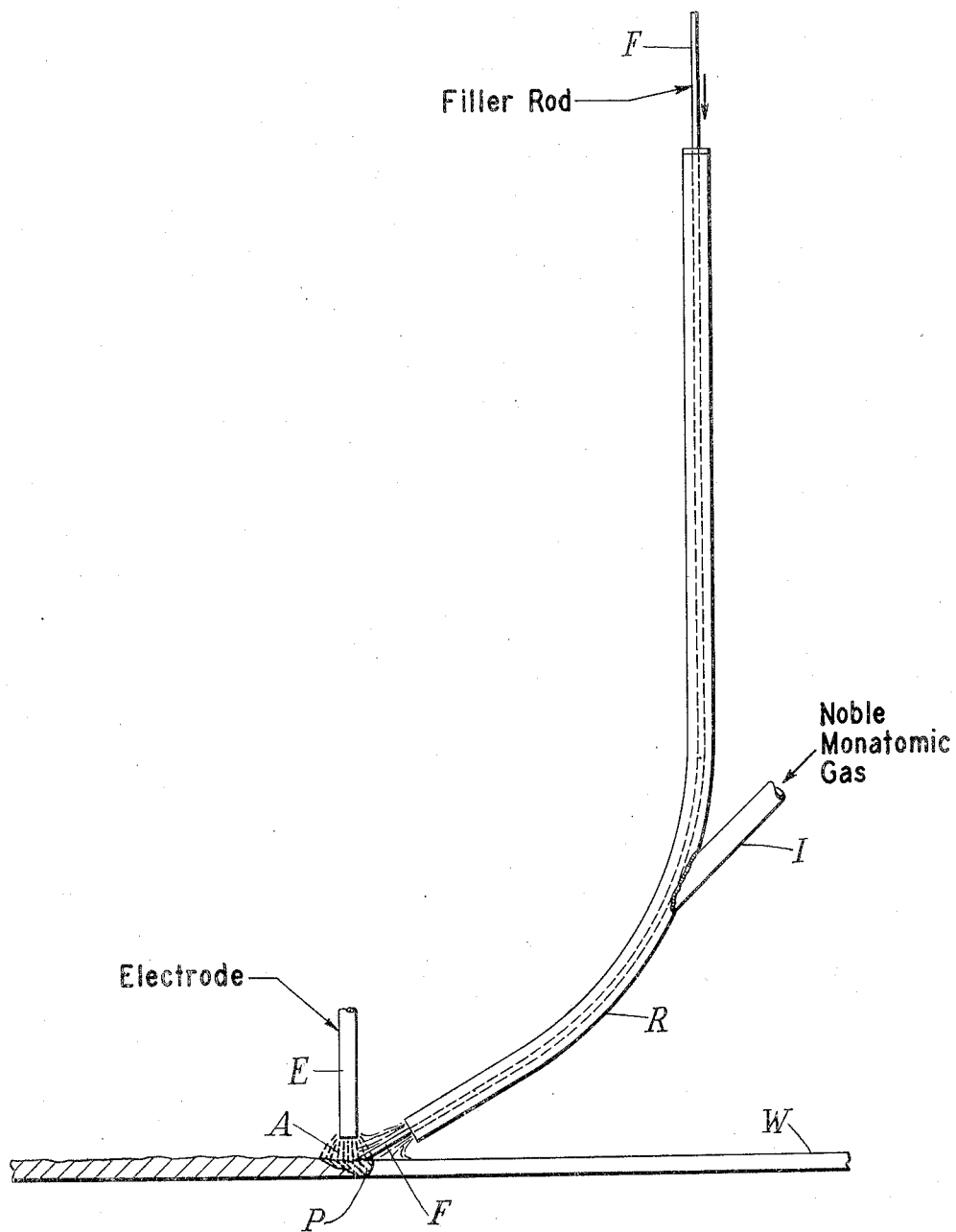

2,496,347

UNITED STATES PATENT OFFICE 2,496,347

INERT GAS BLANKETED WELDING ROD FEED PROCESS

Harry T. Herbst, Roselle, N. J., assignor to The Linde Air Products Company, a corporation of Ohio Application September 5, 1946, Serial No. 695,012

2 Claims. (Cl. 219—10)

This invention relates to electric welding, and more particularly to a method of electric welding of non-ferrous metals and their alloys and stainless steel, which are difficult, unsatisfactory, or impossible to weld by the conventional processes of welding iron and steel, because of contamination of the weld by oxides, nitrides or other combinations of the weld metal with constituents of the air or other atmosphere surrounding the welding zone.

In welding such metals, the molten portions of the adjacent metal parts being welded have been blanketed with an inert gas, preferably a noble monatomic gas such as helium or argon, and particularly when thicker parts are being welded, a filler rod has been supplied to the welding zone. It has been found that when such filler rod is employed, it is difficult to maintain the quality of the weld as high as that obtained without the addition of the rod. A considerable part of such difficulty is that contamination of the weld puddle may be brought about by oxidation of the filler rod as it approaches the puddle, near enough to receive heat from the welding operation, but not sufficiently close to be protected from atmospheric oxygen by the inert gas blanketing the weld puddle.

It is therefore the main object of the present invention to confine a stream of inert gas to surround the filler rod on its way to the welding operation.

According to the present invention, electric welding current is supplied to a welding zone of the metal parts to be welded, filler rod is fed to the welding zone, and the filler rod is blanketed with inert gas before it reaches the welding zone.

In the preferred embodiment, the filler rod is blanketed with inert gas before it reaches the welding zone by feeding the filler rod through a tube, which maintains an annular stream of inert gas surrounding the rod being fed.

In the drawing, the single figure is a side elevation of apparatus for carrying out the method of the present invention.

In the preferred embodiment shown, the electric welding current is supplied to the welding zone or puddle P at the adjacent or abutting edges of the workpieces W to be welded, which are composed of the class of metals difficult to weld, comprising non-ferrous metals and their alloys and stainless steel, particularly magnesium and aluminum.

Preferably the welding current passes between the work W and a tungsten, molybdenum or other suitable electrode E and forms an arc A, which melts adjacent edges of the work W and forms the puddle P. Filler rod F is supplied to the puddle P, the filler rod ordinarily being composed of the same metal as the workpieces W being welded, whether non-ferrous metals or their alloys or stainless steel.

The filler rod F is supplied through a tube R, which receives inert gas from a conduit I, and projects an annular stream of inert gas along the filler rod F to protect the same from contamination on its way to the weld puddle P and also to shield the forward part of the rod F from the radiant heat of the arc and thereby protect it from overheating.

What is claimed is:

1. In an inert gas blanketed arc welding process of welding aluminum and its alloys in which the arc forms a weld puddle, the weld puddle is blanketed by an annular stream of non-oxidizing gas containing essentially argon, and a filler rod containing essentially aluminum is fed to the weld puddle along a path from a position remote from said puddle; the improvement which comprises introducing a supply of non-oxidizing gas containing essentially argon to said path adjacent the rod inlet end thereof, passing an annular stream of said gas from said point of supply along said path to blanket said rod in its passage along said path and prevent contamination of the weld puddle by oxygen carried by said rod, and discharging said gas from the rod projecting end of said path in an annular stream surrounding the rod to blanket the weld puddle.

2. In an inert gas blanketed arc welding process of welding metals having refractory oxides which interfere with the welding operation in which the arc forms a weld puddle, the weld puddle is blanketed by an annular stream of non-oxidizing gas containing essentially an inert noble monatomic gas of the group consisting of helium and argon, and a filler rod consisting of the same metal as that being welded is fed to the weld puddle along a path from a position remote from said puddle; the improvement which comprises introducing a supply of non-oxidizing gas containing essentially an inert noble monatomic gas of the group consisting of helium and argon to said path adjacent the rod inlet end thereof, passing an annular stream of said gas from said point of supply along said path to blanket said rod in its passage along said path and prevent contamination of the weld puddle by oxygen carried by said rod, and discharging said gas from the rod projecting end of said path in an annular stream surrounding the rod to blanket the weld puddle.

HARRY T. HERBST.

REFERENCES CITED

The following references are of record in the file of this patent:

UNITED STATES PATENTS

| Number | Name | Date |
|---|---|---|
| 1,707,433 | Hand | Apr. 2, 1929 |
| 1,746,081 | Hobart | Feb. 4, 1930 |
| 2,091,308 | Catlett | Aug. 31, 1937 |
| 2,216,564 | Chapman | Oct. 1, 1940 |
| 2,274,631 | Meredith | Feb. 24, 1942 |
| 2,306,050 | Frischmann | Dec. 22, 1942 |
| 2,357,376 | Baird | Sept. 5, 1944 |
| 2,360,160 | Pickhaver | Oct. 10, 1944 |
| 2,400,903 | Allen | May 28, 1946 |
| 2,411,465 | Richardson et al. | Nov. 19, 1946 |

FOREIGN PATENTS

| Number | Country | Date |
|---|---|---|
| 496,464 | Germany | May 21, 1930 |